April 30, 1929.  M. M. GOLDBERG  1,711,452
CASH REGISTER
Filed Nov. 15, 1922    7 Sheets-Sheet 1

Inventor
Maximilian M. Goldberg
By Carl Beust
Henry E. Stauffer
His Attorneys

April 30, 1929. M. M. GOLDBERG 1,711,452
CASH REGISTER
Filed Nov. 15, 1922    7 Sheets-Sheet 2
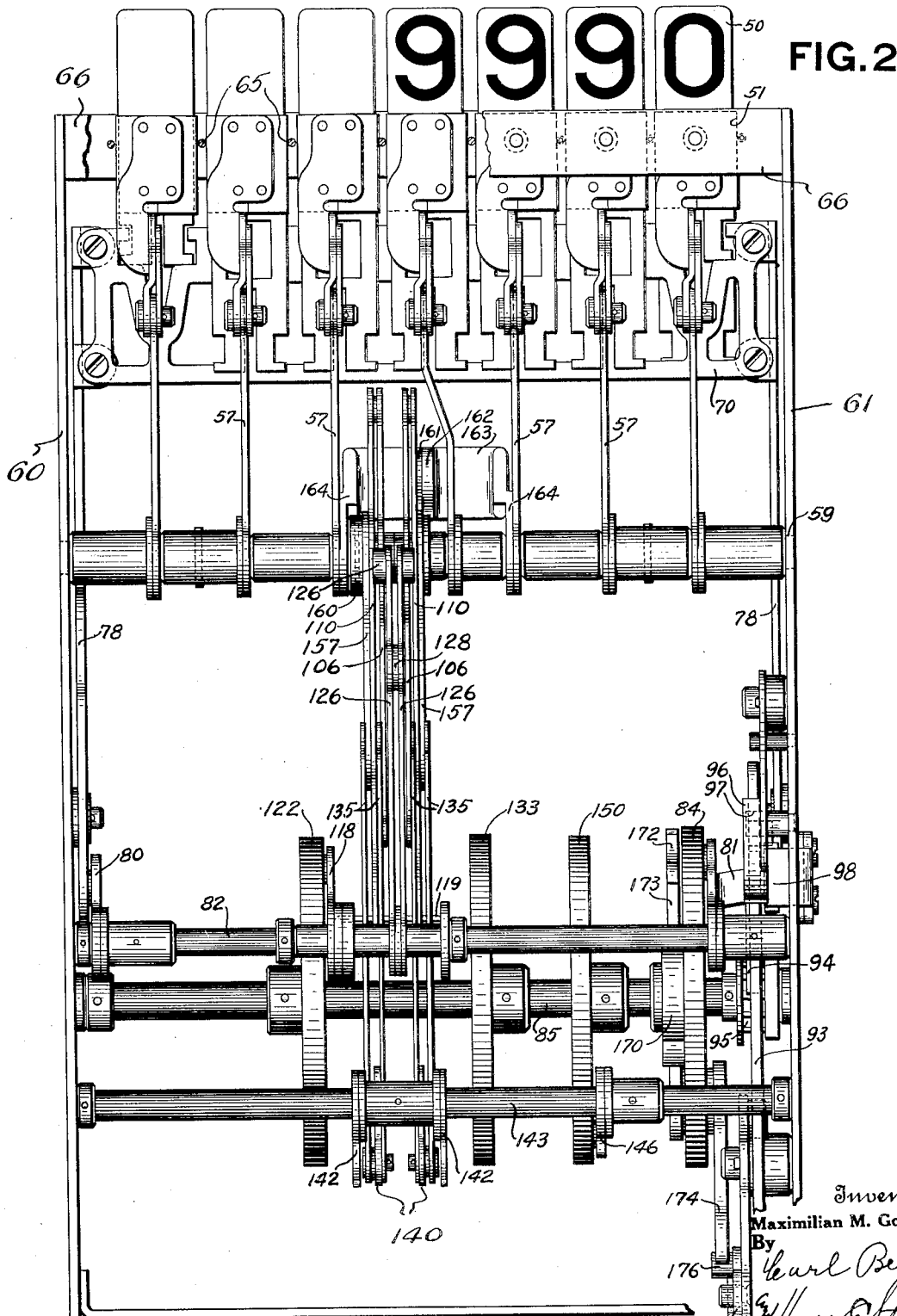
FIG. 2
Inventor
Maximilian M. Goldberg
By
His Attorneys April 30, 1929.                M. M. GOLDBERG                1,711,452
                                CASH REGISTER
                      Filed Nov. 15, 1922      7 Sheets-Sheet 3
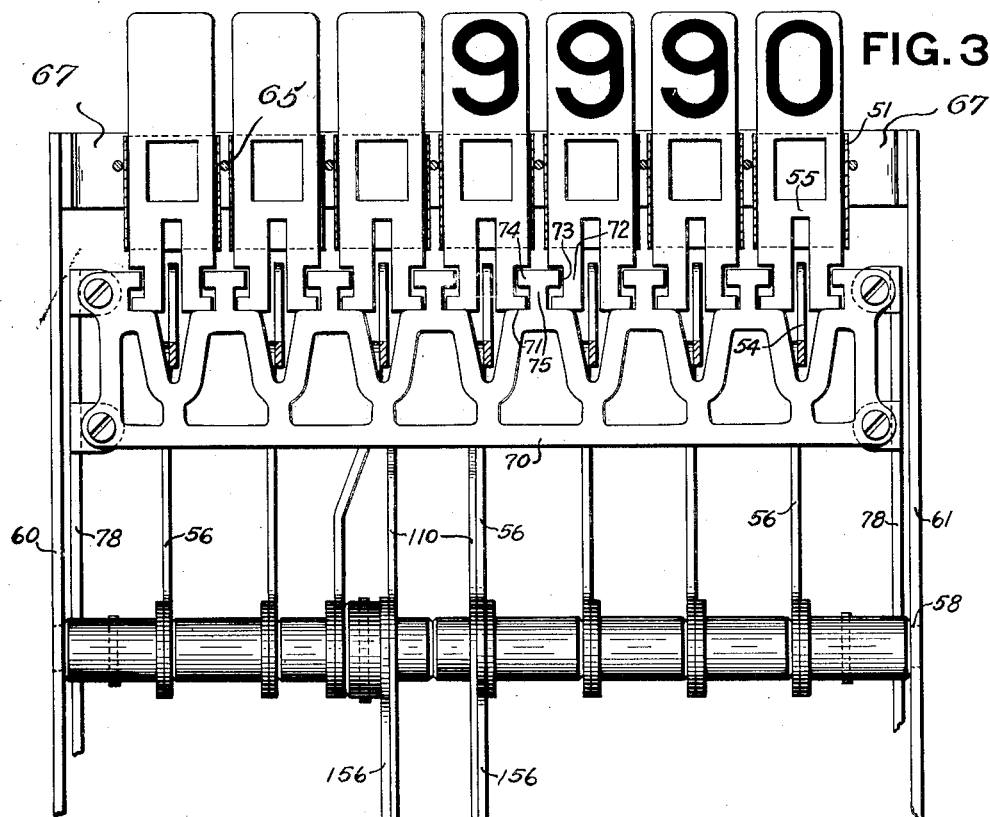
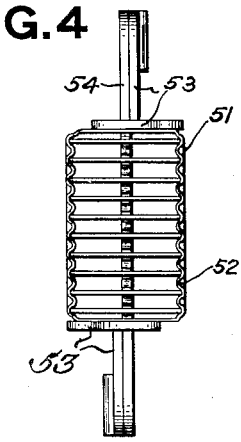
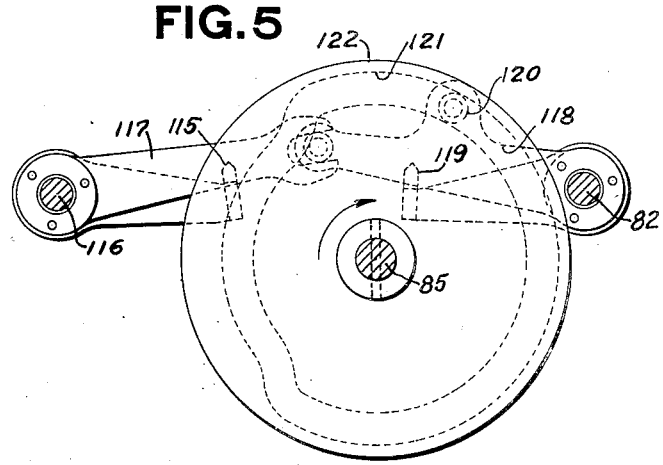
Inventor
Maximilian M. Goldberg
By Carl Beust
and Henry E Stauffer
His Attorneys April 30, 1929.   M. M. GOLDBERG   1,711,452
CASH REGISTER
Filed Nov. 15, 1922   7 Sheets-Sheet 4
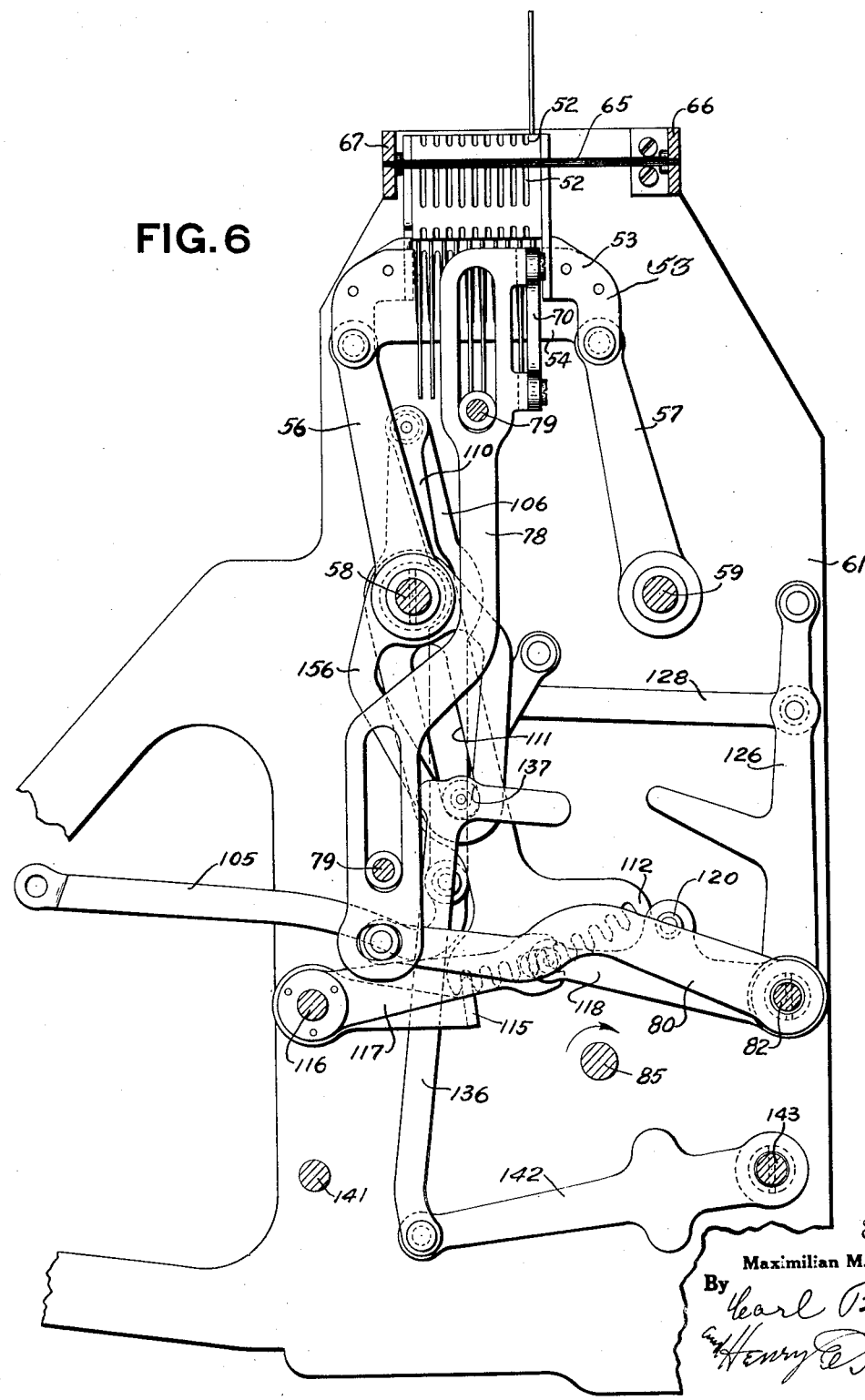

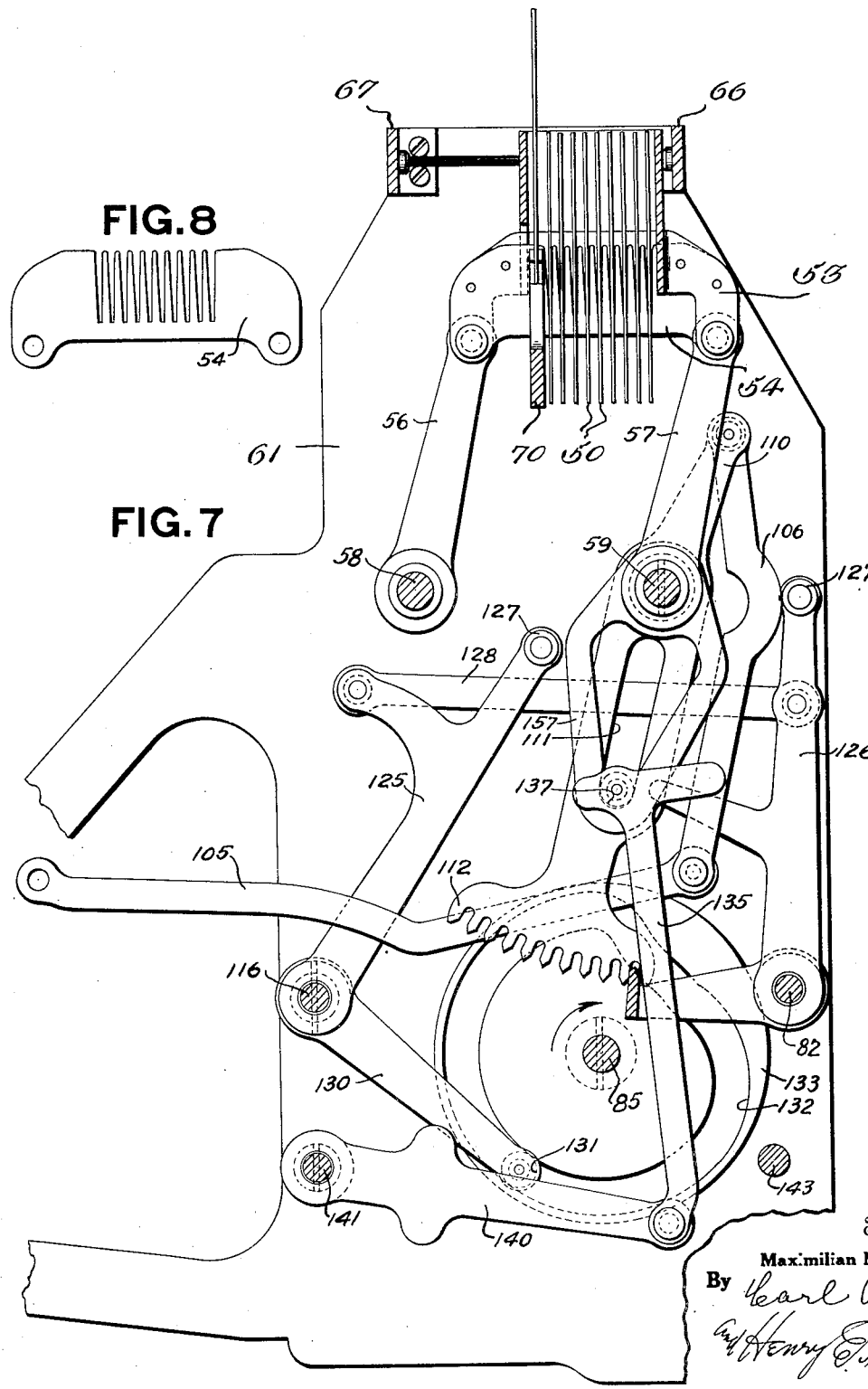

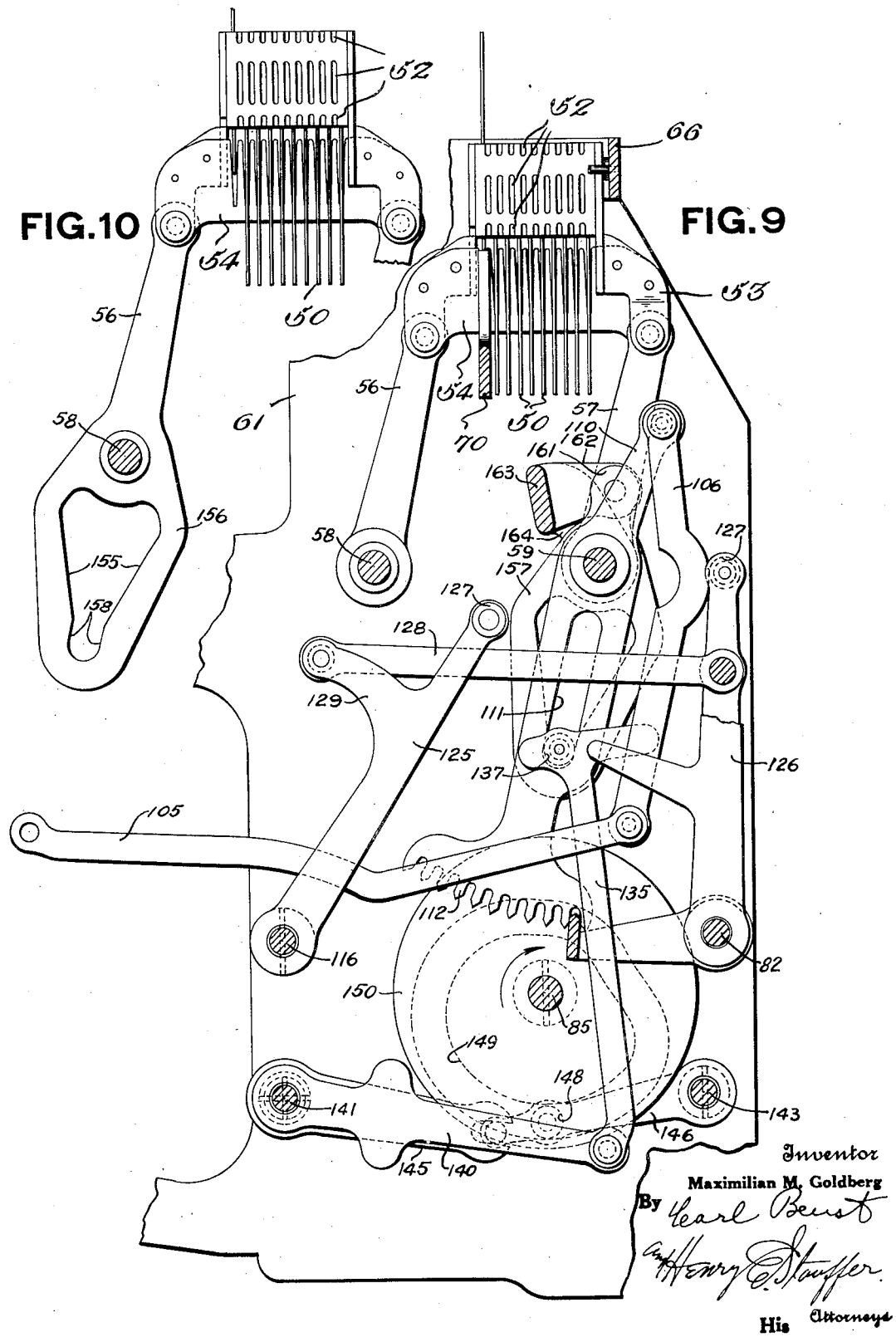

April 30, 1929.　　M. M. GOLDBERG　　1,711,452
CASH REGISTER
Filed Nov. 15, 1922　　7 Sheets-Sheet 7

Inventor
Maximilian M. Goldberg

Patented Apr. 30, 1929.

1,711,452

UNITED STATES PATENT OFFICE.

MAXIMILIAN M. GOLDBERG, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed November 15, 1922. Serial No. 601,132.

This invention relates to adding machines and especially to the type of machine shown in Letters Patent of the United States granted to Hubert Hopkins, No. 1,039,130, September 24, 1912.

One object of this invention is to provide indicating mechanism especially adapted for machines comprising spring-driven actuators, though it be understood that it is also adapted for use with positively driven actuators.

It is an object of this invention to provide freely operable means adjustable under control of spring driven actuators, for setting up a condition to determine the position into which a tablet indicator carriage will be adjusted by subsequently operating actuating means.

It is also an object of this invention to move such adjusting means directly from a prior position of adjustment to its new position and to this end, means operating in conjunction with spring-driven actuators is provided for positively moving a point on said adjusting means to the same position during each operation of the machine under the driving force of an operating handle by which the machine is driven.

It is a further object to move the tablet indicator carriage as determined by the position of said adjusting means, by driving means other than the spring driven actuators, and preferably as in the particular embodiment disclosed, by the spring which returns the operating handle to home position.

With these and incidental objects in view, the invention consists in certain novel features of construction and combinations of parts, the essential elements of which are set forth in appended claims and a preferred form or embodiment of which is hereinafter described with reference to the drawings which accompany and form part of the specification.

Of said drawings:

Fig. 2 is a rear elevation of the indicator mechanism.

Fig. 3 is a detail rear view showing the plate for lifting the indicators.

Fig. 4 is a top plan view of the tablet indicator carriage.

Fig. 5 is a detail view showing the alining mechanism.

Fig. 6 is a sectional view showing the mechanism for setting the "cents" indicator carriages.

Fig. 7 is a sectional view showing the mechanism for setting the "dimes" indicator carriages.

Fig. 8 is a detail elevational view of the comb-shaped plate which normally supports the indicators.

Fig. 9 is a sectional view showing the mechanism for setting the "dollars" indicator carriages.

Fig. 10 is a detail view of the differential cam for setting the "tens of dollars" indicator carriage.

Figure 1:
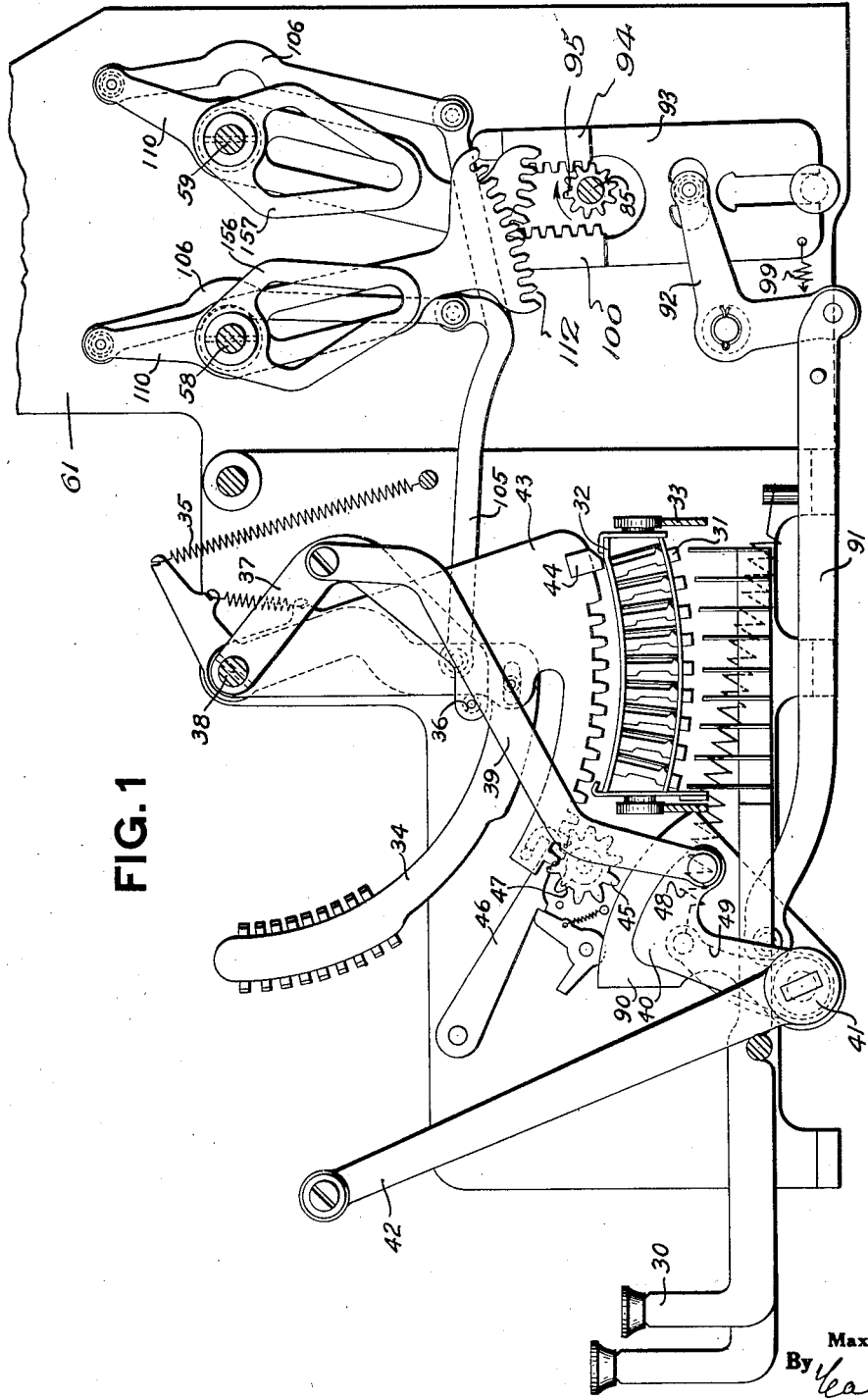
Fig. 1 is a view showing the type of machine to which the improvement is attached and shows only the driving connections between the old machine and the improvement.

This invention comprises indicating mechanism especially adapted for use in connection with accounting machines involving spring-driven actuators. In the embodiment disclosed in the drawings the invention has beeen shown in connection with a ten-key accounting machine of the type disclosed in the patent to Hopkins to which reference has been made.

Pivoted key-levers 30 (Fig.1) when operated set up pins 31 to represent amounts to be printed, added and indicated. These pins are mounted in a carriage 32 movable laterally on rails 33, its lateral movement being controlled by any well known escapement mechanism. Type carriers 34 are normally urged in a clockwise direction by springs 35 but are held in home position, i. e., one step beyond zero, by a rod 36 carried by arms 37 pinned to a rock shaft 38. One of the arms is connected by a link 39 to an arm 40 on a shaft 41 on which a handle 42 is mounted, spring means 48 being provided to return the handle into the home position as shown.

When the handle is lowered the type carriers are moved forward by the springs 35 and after passing zero they carry with them actuators 43 which are provided with lugs 44 cooperating with the pins 31 to arrest the actuators and type carriers in the positions determined by the projected pins 31. When the actuators are returned, they operate a totalizer 45. Transfers are effected by an added step of movement of the actuators permitted when transfer arms 46 are raised by the inclined sides of transfer teeth 47 on wheels of lower order cooperating with inclined sides of projections on the transfer arms. The totalizer controls the movement of the actuators in total printing and total indicating operations in the usual manner, in which operations the transfer arms 46 arrest the totalizer wheels in the zero positions as the straight sides of the teeth 47 are brought into contact with the straight sides of the projections on the transfer arms 46.

*Indicating tablets and carriages therefor.*

Indicator tablets 50 (Fig. 2), are provided for indicating the amounts entered in the totalizer or the amount standing in the totalizer. These tablets are arranged in two groups, one indicating to the front and the other to the rear, for each, except the highest totalizer wheel, for which only one group is provided, the latter indicating to both the front and the rear. The tablets are guided in carriages 51 (Figs. 4) provided with three rows of depressions 52 (Figs. 4 and 6) forming guideways on the inner surfaces of the side members of the carriages to guide the tablets as they are moved into and out of exposed positions. Secured to the ends of the carriages are brackets 53 to which are secured comb-shaped supports 54 (Fig. 8) between the teeth of which cross webs 55 (Fig. 3) of the tablets are guided as the tablets move into and out of their lowermost positions. The backs of the comb-shaped supports carry the tablets within the carriages.

The brackets 53 and supports 54 (Fig. 6) are provided with ears pivoted to the arms 56 and 57 supported on shafts 58 and 59 mounted in side frames 60 and 61 which are suitably secured to the frame of the adding machine proper and which support the indicating mechanism.

The tablet indicator carriages are supported on these shafts for rearward and forward movement between rods 65 (Figs. 2 and 6), supported in cross bars 66 and 67 connecting the side frames.

There are ten tablets in each group and means operating during each operation of the machine is provided to move a selected tablet into view. This means comprises a vertically movable tablet lifter 70 (Figs. 3 and 6) provided with supporting shoulders 71 for cooperation with legs 72 on the tablets. These legs are provided with laterally opening recesses 73 receiving laterally extending projections 74 on upstanding lugs 75 adjacent to the shoulders 71 to effectively couple the selected tablets to the lifter to be positively moved thereby out of exposed position.

Figure 11:
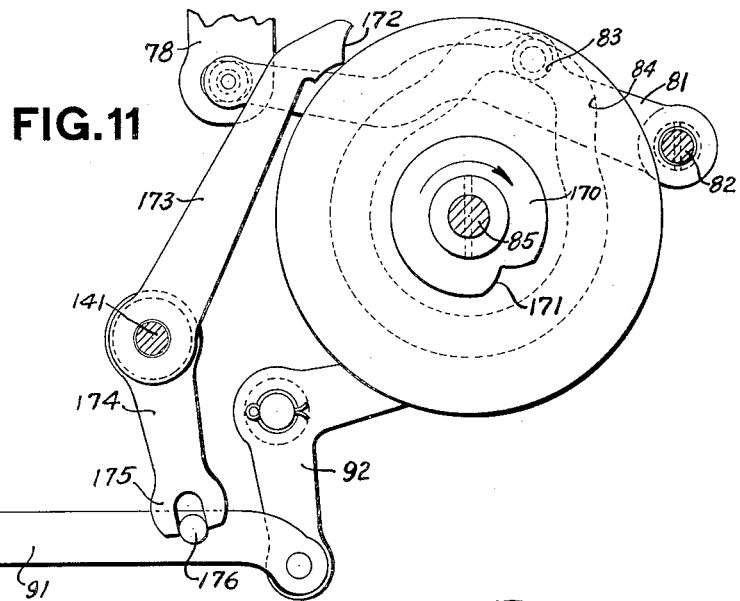
Fig. 11 is a detail view showing the cam for lifting the tablet indicators and the mechanism for stopping the cam shaft after it has been turned 180 degrees.

The tablet lifter 70 is actuated by slidable links 78 (Fig. 6), guided on roller bearing studs 79 secured in the side frame. The links 78 are actuated by arms 80 and 81 (Figs. 2, 6 and 11), provided with hubs secured to a shaft 82. The arm 81 (Fig. 11) carries a roller 83 which cooperates with a box cam 84 secured on the main driving shaft 85. This shaft is given one rotation during each operation of the machine and the cam is shaped to lower tablets, displayed during the preceding operation, just after the beginning and raise newly selected tablets just before the end of an operation.

Figure 12:
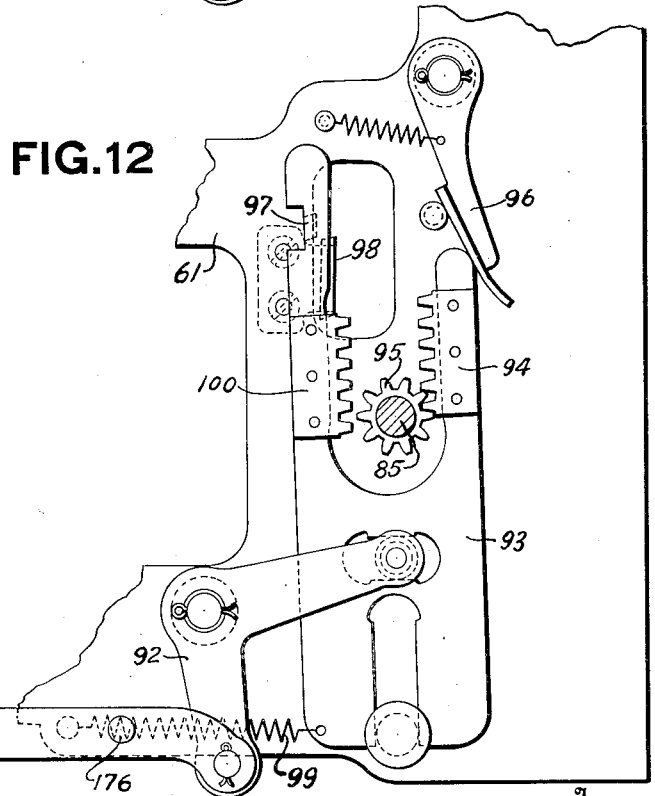
Fig. 12 shows the cam shaft driving mechanism.

The shaft 85 receives its rotation from the shaft 41 (Fig. 1) which is oscillated during each operation of the machine, thereby rocking a segmental arm 90, and through link 91 a bell crank 92, which is provided with a roller engaging a slot in a slide 93 having opposed racks 94 and 100 (Fig. 12). In the home position the rack 94 is held in mesh with a gear wheel 95 on the rotation shaft 85 by a spring-drawn pawl 96. Downward movement of the slide 93 and rack 94 rotates shaft 85 clockwise, engagement of the rack 94 with the gear being maintained by a flange 97 on the slide 93 and a flange 98 secured to the side frame 61. At the completion of the downward movement of the slide 93 a coiled spring 99 rocks the slide 93 to move the rack 100 into mesh with the gear to continue the clockwise movement of the shaft as the slide 93 is raised, guided by the flanges 97 and 98.

*Tablet selecting mechanism.*

The mechanism for raising the tablet indicators into exposed view and the means for supporting the tablet indicator carriages to permit any tablet to be brought into cooperative relationship with the tablet lifter 70 have been set forth. Means for controlling the movement of the tablet indicator carriages is provided. This means includes freely adjustable beams connected to the type carriers and positioned thereby and by positive actuating means driven from the main driving shaft. The positions of adjustment of said beams determines the positions into which the tablet indicator carriages will be moved by mechanism also operated from the main driving shaft.

The cents, dimes, dollars, and tens of dollars type carriers 34 are connected by links 105 with adjusting beams 106 (Figs. 6, 7 and 9). The upper ends of the beams are pivoted to the upper ends of differentially adjustable levers 110 supported on shafts 58 and 59, the levers for the cents and tens of dollars beams being supported on shaft 58, and for the dimes and dollars beams on shaft 59. Each lever has a slot 111 to act as a guide for a purpose later set forth, and its lower edge is provided with teeth 112 with which cooperates alining means. The front levers 110 are alined by an aliner 115 carried by arms pivoted on shaft 116. One of these arms (Fig. 5) is connected to an arm 117 bifurcated to receive a pin carried by an arm 118 pivoted on the rock shaft 82 and rigidly connected to one arm of an aliner 119, similar in construction to that of the aliner 115, and cooperating with the racks on the rear levers 110. The arm 118 carries a roller 120 cooperating with a cam groove 121 in a disk 122 secured to the rotation shaft 85. The aliners are moved out of functioning positioning as the type carriers move forward to zero.

As the beams 106 are adjusted by the type carriers they are also moved to positively adjust the levers 110 by pairs of driving arms 125 and 126, the arms of each pair being provided with oppositely extending rollers 127 to cooperate with the beams. A link 128 lying between and connected to the arms 126 extends between arms 125 and is connected to extensions 129 thereon to transmit movement to the arms 126. The arms 125 are connected together by a hub pinned to the rock shaft 116 to which also is pinned an arm 130 (Fig. 7) carrying a roller 131 cooperating with a cam groove 132 in a disk 133 on shaft 85. The cam grooves 121 (Fig. 5) and 132 (Fig. 7), are timed so that after the aliners are disengaged from the alining teeth 112 the beams will be moved to position the levers 110, after which the aliners will be moved into engaging position. The positions now occupied by the levers determines the positions of the indicator carriages at the time the tablet lifter 70 is operated.

The means for positioning the indicator carriages comprises driving links 135 (Figs. 7 and 9) for the dimes and dollars carriages and driving links 136 (Fig. 6) for the cents and tens of dollars carriages. These links are constructed in pairs, and each pair carries a roller 137 operating in the slot 111 of its corresponding lever 110.

The links 135 are supported on arms 140 (Figs 7 and 9) pinned to a shaft 141. The links 136 are supported on arms 142 (Fig. 6) pinned to a rock shaft 143. Pinned to the rock shaft 141 (Fig. 9) is an arm 145 bifurcated at its end to receive a pin on an arm 146 pinned to the rock shaft 143. The arm 146 carries a roller 148 which cooperates with a cam groove 149 in a disk 150 secured on the rotation shaft 85. The cam groove is shaped to raise the drivers to permits adjustment of the levers 110, and to lower them after the levers are adjusted, to effect an adjustment of the indicator carriages as determined by the position of the levers.

The rollers 137 also cooperate with downwardly converging walls 155 (Figs. 10 and 9) in cam arms 156 and 157 supported on the shafts 58 and 59 and operatively connected with the arms 56 and 57 supporting the indicator carriages. The walls 155 of cam arms 156 and 157 terminate in parallel edges 158 (Fig. 10), between which the rollers 137 rest when the links 135 and 136 have been returned to home positions and the indicator carriages adjusted. When the rollers 137 are in their elevated positions they are permitted to move freely laterally with the levers 110 as they are adjusted by the type carriers and the arms 125 and 126, the distance between the walls 155 being sufficient to accommodate the movements of the rollers.

As shown in Fig. 10, the cam arm 156 is integrally formed with the arm 56 supporting the front end of the tens of dollars indicator carriage. The cam arm 156 for the cents indicator carriages is pinned to the shaft 58 (Figs. 3 and 6) to which are also pinned the front arms 56 supporting the end or cents indicator carriages. The cam arm 157 for the dimes indicator carriages (Figs. 2 and 7) is pinned to the shaft 59 at 160 (Fig. 2) to which also are pinned the rear supporting arms 57 for the dimes indicator carriages. The dollars cam arm 157 (Fig. 9) is provided with an ear 161 (Figs. 2 and 9) connected to an ear 162 projecting centrally from a yoke 163 whose arms 164 are pivoted on the shaft 59. These arms are directly connected to the rear supporting arms 57 of the dollars indicator carriages which lie on opposite sides and adjacent to the central or tens of dollars indicator carriage (Fig. 2).

By means of the mechanism described, the beams 106 pivot about their connection with the adjusting levers 110 as the type carriers are adjusted under the influence of the springs 35, and about their connection with the links 105 as the arms 125 and 126 operate upon them to move them against hubs on the cam arms to position the levers 110. The position of the slots 111 in the levers 110 determines the selection of the tablets. The driving links 135 and 136 which had been raised are now lowered to aline the edges 158 with the slots 111 to position the indicator carriages through the mechanism set forth.

As hereinbefore described, the rotation shaft 85 is driven from a slide 93 (Fig. 12), the racks 94 and 100 being thrown alternately into mesh with a gear 95 secured to the rotation shaft. At the time the rack 94 is disengaged from, and the rack 100 is engaged with, the gear 95, the shaft has acquired a momentum which may be sufficient to turn the shaft while it is disengaged from either rack. To prevent this, the shaft 85 is equipped with a disk 170 (Fig. 11) provided with a notch 171 which is located to move in position to receive the end 172 of an arm 173 at the time the racks 94 and 100 are shifted to the right. The arm 173 is supported on the shaft 141 and is rigid with an arm 174, also supported on this shaft. The arm 174 is provided with a bifurcated end 175 to receive a driving pin 176 carried by the link 91 operated by the handle 43. The parts are proportioned to move the end 172 of the arm 173 into the notch 171 of the disk 170 to arrest the shaft 85 momentarily as the slide 93 is swung to the right.

Operation.

An amount is entered by successively depressing the amount key levers 30. Each depression of a key raises a pin stop 31 and releases an escapement mechanism to move the carriage one step to the left. After the amount is thus set up, the operating handle 42 is moved down, and then released, to be returned under the action of the spring means 48. As the operating handle is lowered, the rod 36 is moved to the left to permit the springs 35 to move the type carriers to the left until arrested by the pins 31 in cooperation with the lugs 44 on the totalizer actuators 43. The usual loose connections between the type carriers and actuators are provided to permit of an added step of movement of the actuators for effecting transfers. The connection between the operating handle and rod 36 is such that the handle is moved approximately one-third of its total counter-clockwise movement before the type carriers reach zero, it being understood that in machines of this type, the type carriers are moved one step beyond zero when they are returned to the home position by the rod 36. All of this structure is old and well known, and this reference is made merely because of its bearing on the operation of the indicating mechanism.

During the time required to lower the operating handle, the previously exposed tablet indicators are lowered, the differential driving links 135 and 136 are raised to place the rollers 137 into the wide part of the slots 111 in the adjusting levers 110 and the aliners 115 and 119 are lowered. This permits the beams 106 and levers 110 to move freely on their pivots as the type carriers are moved to printing position to print the amounts that were set up on the keyboard. The arms 125 and 126 are moved forwardly to move the beams 106 against the hubs on the cam arms 156 and 157 at approximately the same time type carriers moving to the "9" position have reached their adjusted positions. The aliners 115 and 119 are then raised to hold the levers 110 in adjusted positions. The handle has now reached its lowermost position; the arms 125 and 126 are returned at the beginning of the return movement of the handle; the type carriers and actuators are returned as usual; the differential links 135 and 136 are lowered to position the indicator carriage; and the lifter is then raised to raise the selected tablet indicators into view. The aliners and differential links are left in the positions shown in the drawings at the completion of an operation, to provide for sustained indication. The type carriers and totalizer actuators are positively returned to zero as usual.

While the form of mechanism herein shown and described is admirably adapted to fulfil the objects primarily stated, it is to be understood that it is not intended to confine the invention to the one form or embodiment herein disclosed, for it is susceptible of embodiment in various forms all coming within the scope of the claims which follow.

What is claimed is:—

1. A tablet indicator for an accounting machine comprising an upper portion bearing a character, downwardly extending supporting members, each provided with a recess, and a member connecting said supporting members.

2. A tablet indicator for an accounting machine comprising a body portion bearing a character, and a supporting portion below said body portion provided with pairs of oppositely facing shoulders separated by a recess.

3. The combination of a tablet indicator provided with a laterally extending recess, a tablet indicator lifter, a shoulder thereon adapted to engage and support an end of the tablet indicator, and a projection on said lifter extending within said recess.

4. The combination of a tablet indicator lifter, spaced shoulders thereon, a T-shaped member projecting from said lifter between said shoulders, and tablet indicators adapted to be engaged and supported by said shoulders and provided with recesses to receive opposite ends of the head of said T-shaped member.

5. The combination of a tablet indicator carriage comprising side portions and a base portion spaced from said side portions, tablet indicators supported on said base portion and provided with depending leg portions, and a tablet lifter adapted to be operatively associated with the leg portion of any one of said tablet indicators.

6. The combination of a tablet indicator carriage comprising side portions and a base portion spaced from said side portions, tablet indicators supported on said base portion and provided with depending leg portions, and a tablet lifter adapted to be operatively associated with the leg portion of any one of said tablet indicators, said lifter being provided with a notch in line with said base portion to receive the same as the tablet indicators are lifted.

7. The combination of a tablet indicator supporting bar, tablet indicators provided with spaced legs to straddle said bar, a lifter provided with a notch to receive said bar as the tablet indicators are lifted.

8. The combination of a differentially movable member, spring-actuated means operating upon said member in a certain direction for differentially positioning said member, and positively operated means operating upon said member in the same direction.

9. A tablet indicator carriage comprising spaced side members provided with guides, a vertically disposed base member, and guides on said base member extending into proximity to a plane through the lower ends of the guides on said side members.

10. A tablet indicator carriage comprising spaced side members provided with guides, a comb-shaped guide member disposed in a plane intermediate of said side members to constitute base guiding means, with the free ends of its teeth so related to the lower ends of the guides on the side members as to insure the proper positioning of the lower ends of associated tablets.

11. In combination with a ten-key machine involving a bank of keys, a transversely movable carriage, controlling pins carried thereby, spring-driven actuators controlled by said pins, and an operating handle for releasing said actuators and for positively returning them to normal; an indicating mechanism involving an adjustable member adjustable under the simultaneous controls of said actuators and operating handle.

12. In combination with a ten-key machine involving a bank of keys, a transversely movable carriage, controlling pins carried thereby, spring-driven actuators controlled by said pins, and an operating handle for releasing said actuators and for positively returning them to normal; an indicating mechanism involving differentially adjustable members for controlling the indication, connections between said adjustable members and actuators, driving members cooperating with said adjustable members, and connections between said driving members and operating handle.

13. In combination with a ten-key machine involving a bank of keys, a transversely movable carriage, controlling pins carried thereby, spring-driven actuators controlled by said pins, and an operating handle for releasing said actuators and for positively returning them to normal; an indicating mechanism involving differentially adjustable members for controlling the indication, positive connections between said adjustable members and actuators, driving members cooperating with said adjustable members, and connections between said driving members and operating handle.

14. In combination with a ten-key machine involving a bank of keys, a transversely movable carriage, controlling pins carried thereby, spring-driven actuators controlled by said pins, and an operating handle for releasing said actuators and for positively returning them to normal; an indicating mechanism involving differentially adjustable members for controlling the indication, connections between said adjustable members and actuators, driving members cooperating with said adjustable members, and positive connections between said driving members and operating handle.

15. In combination with a ten-key machine involving a bank of keys, a transversely movable carriage, controlling pins carried thereby, spring-driven actuators controlled by said pins, and an operating handle for releasing said actuators and for positively returning them to normal; an indicating mechanism involving differentially adjustable members for controlling the indication, positive connections between said adjustable members and actuators, driving members cooperating with said adjustable members, and positive connections between said driving members and operating handle.

16. The combination of manipulative amount determining means, spring actuated members differentially movable under control of said amount determining means, means for normally restraining movement of said actuators against the influence of said springs, differentially settable members, alining means therefor normally in engagement therewith, means connecting said settable members with said spring actuated members, and an operating means for moving said alining means to inoperative position for releasing said spring actuated members and for operating upon said connecting means to position said differentially movable means as determined by the amount determining means manipulated.

17. The combination of manipulative amount determining means, spring driven members differentially movable under control of said means and normally in home position one step beyond zero, differentially settable members controlled by said members, normally engaged alining means therefor, an operating means for causing movement of said differentially movable members under the influence of said springs, and means operated by said operating means for releasing said alining means as said spring driven members move up to zero.

18. The combination of differentially movable type carrier members adjustable from zero position under control of manipulative amount determining means, differentially settable indicator selecting controlling means connected to and operated by said carrier members, alining means therefor, and an operating means for disengaging said alining means before said carrier members move from zero.

19. The combination of differentially movable type carriers spring driven in one direction, indicating means, indicator selecting means controlled by the movement of said type carriers in said direction, and means operable independently of said type carriers for operating said indicator selecting means.

20. The combination of differentially movable type carriers spring driven in one direction, indicating means, indicator selecting means controlled by the movement of said type carriers in said direction, and means for returning said type carriers to home position and for operating said indicator selecting means.

21. The combination of differentially settable guiding members arranged in the same plane, differentially adjustable cam members arranged in a plane parallel to said first mentioned plane, and means cooperating with said guiding members and cam members for differentially adjusting said cam members as determined by the position of said guiding members.

22. The combination of differentially movable type carriers spring driven into printing position, an operating spring for returning said carriers to home position, and an indicating mechanism involving means differentially positioned under control of the type carriers for controlling the indication, and means operated by said operating spring for effecting an indication in accordance with the control set up by the type carriers.

23. The combination of forwardly spring actuated differentially movable members, movable tablet indicator carriages for indicating amounts of differential movements of said members, freely operable means differentially movable under control of said differentially movable members, an operating means, a differentially settable member adjusted under control of said freely operable members and operating means, and means operated by said operating means for adjusting said carriages in accordance with the adjustment of said settable means.

In testimony whereof I affix my signature.

MAXIMILIAN M. GOLDBERG.